United States Patent [19]

Akiyama et al.

[11] Patent Number: 4,602,082
[45] Date of Patent: Jul. 22, 1986

[54] PROPYLENE-BASE RANDOM COPOLYMER PARTICLES AND PRODUCTION PROCESS THEREOF

[75] Inventors: Hiroyuki Akiyama, Hiratsuka; Susumu Izawa, Utsunomiya; Hideki Kuwabara, Hadano, all of Japan

[73] Assignee: Japan Styrene Paper Corporation, Tokyo, Japan

[21] Appl. No.: 795,431

[22] Filed: Nov. 6, 1985

[30] Foreign Application Priority Data

Mar. 20, 1985 [JP] Japan ................................. 60-57454

[51] Int. Cl.[4] .......................... C08F 6/00; C08J 9/18
[52] U.S. Cl. ...................................... 528/481; 264/141; 264/142; 264/143; 521/56; 521/60; 521/143; 528/503
[58] Field of Search ................ 528/481, 503; 264/141, 264/142, 143; 521/56, 60

[56] References Cited

U.S. PATENT DOCUMENTS

| | | | |
|---|---|---|---|
| 3,445,444 | 5/1969 | Kutner | 528/481 |
| 3,634,382 | 1/1972 | Trieschmann et al. | 528/481 |
| 3,719,648 | 3/1973 | Friedink | 528/481 |

*Primary Examiner*—Morton Foelak
*Attorney, Agent, or Firm*—Sherman & Shalloway

[57] ABSTRACT

Disclosed herein are propylene-base random copolymer particles suitable for use in the production of pre-foamed particles. The copolymer particles are obtained by heating starting copolymer particles to the crystallization temperature thereof and then quenching them in a medium of (the crystallization temperature−30° C.) or lower. Processes for obtaining the copolymer particles are also disclosed. Pre-foamed particles produced using the copolymer particles contain large cells. They can thus provide foamed moldings which are substantially free of shrinkage and have good flexibility.

12 Claims, No Drawings

PROPYLENE-BASE RANDOM COPOLYMER PARTICLES AND PRODUCTION PROCESS THEREOF

This invention relates to propylene-base random copolymer particles suitable for use in the production of pre-foamed particles and a production process thereof.

Foamed moldings (which may hereinafter be referred to as "molded articles") made of polystyrene or polyethylene as their base resin have conventionally been manufactured by beads expansion molding processes.

The present applicant paid special attention to the characteristic properties of propylene-base resins and established a series of beads expansion molding processes for such resins. Some patent applications have already been made on the production of foamed moldings of propylene-base resins. For example, with respect to foamed moldings making use of an ethylene-propylene copolymer as a base resin, reference may be made to Japanese Patent Publication No. 43492/1984 which discloses a basic beads expansion molding process.

The process disclosed in the above publication has a merit that it can provide good moldings or molded articles and is thus an excellent beads expansion molding process from the industrial viewpoint.

Incidentally, there are a variety of properties required for foamed moldings, among which dimensional stability and flexibility are both important properties. The term "dimensional stability" pertains to the shrinkage of each molded article upon its molding work, while the term "flexibility" deals with the physical strength of each molded article against bending loads, in other words, the nerve of each molded article.

No significant investigations have heretofore been made on the production of foamed moldings or molded articles equipped with both good dimensional stability and good flexibility. There were some conventional products, the dimensional stability and flexibility of which have been improved to certain extents. Such conventional products were however still unsatisfactory.

The present inventors carried out an extensive research with a view toward providing a solution to the above-mentioned problems. As a result, they found empirically the fact that molded articles having poor dimensional stability and flexibility will result when pre-foamed particles having smaller cell diameters are used for expansion molding work. Accordingly, they proceeded with a further research to determine which parameters of production steps govern the sizes of cell diameters. As a result, it was found that the sizes of cell diameters are closely correlated to the heat history of un-foamed particles in the course of their production. In accordance with an experiment which the present inventor conducted, it was found that cell diameters become greater when the temperature gradient ranging from the heating and softening or the melting of a resin to the formation of particles upon production of un-foamed particles is great.

An object of this invention is, on the basis of the above findings, to provide propylene-base random copolymer particles suitable for use in the production of pre-foamed particles which permit production of molded articles having excellent dimensional stability and flexibility as well as a production process of such propylene-base random copolymer particles.

As a result of a still further extensive investigation, the present inventors have finally found that propylene-base random copolymer particles, which have been obtained by heating their starting resin to its crystallization temperature or higher and then quenching it in a medium at a temperature of (the crystallization temperature −30° C.) or lower upon production of starting propylene-base random copolymer particles, can produce pre-foamed particles having large cell diameters and can hence provide molded articles having excellent dimensional stability and flexibility, leading to completion of this invention.

In one aspect of this invention, there is thus provided propylene-base random copolymer particles suitable for use in the production of pre-foamed particles, which are characterized in that said copolymer particles have been heated to the crystallization temperature thereof or higher and then quenched in a medium at a temperature of (the crystallization temperature −30° C.) or lower.

In another aspect of this invention, there is also provided a process for producing propylene-base random copolymer particles suitable for use in the production of pre-foamed particles, which comprises:

charging starting propylene-base random copolymer particles together with a dispersing medium in a vessel;

heating with stirring the contents to a temperature of the crystallization temperature of the starting copolymer particles or higher; and releasing the thus-heated starting copolymer particles and dispersing medium out of the vessel into a medium at a temperature of (the crystallization temperature −30° C.) or lower so as to quench the thus-heated starting copolymer particles.

In a further aspect of this invention, there is also provided a process for producing propylene-base random copolymer particles suitable for use in the production of pre-foamed particles, which comprises the following steps:

heating and melting a propylene-base random copolymer resin in an extruder;

extruding the resultant melt through orifices of an extruder;

quenching the resultant extrudates with a cooling medium at a temperature of (the crystallization temperature of propylene-base random copolymer resin −30° C.) or lower; and chopping the thus-quenched extrudates into particles.

The above aspects of this invention will hereinafter be described specifically.

For the sake of convenience, the production process making use of the vessel will be called "the first production process" while the production method relying upon the extruder will be called "the second production process".

As exemplary propylene-base random copolymers useful in the practice of each of the production processes, there may be mentioned ethylene-propylene random copolymers, 1-butene-propylene random copolymers, etc. They may be used either singly or in combination. It is however preferred to use ethylene-propylene random copolymers singly.

When ethylene-propylene random copolymers are used, those containing the ethylene component in amounts of 0.5–10 wt. % are preferred. If the content of the ethylene component should be smaller than 0.5 wt. %, it will be difficult to pre-foam the resultant particles and hence to obtain pre-foamed particles having uniform cells and a high percentage of closed cells. On the other hand, any contents of the ethylene component in excess of 10 wt. % will result in foamed moldings or molded articles having insufficient stiffness.

In the first production process, propylene-base random copolymer particles are charged together with a dispersing medium in a vessel. As such particles, it is possible to use pellet-shaped particles, pulverized powder, etc. Namely, they may take any shapes. However, the preferred average volume of such copolymer particles may be 0.03–4 mm$^3$/particle. Outside this range, it will be difficult to control the average volume of resultant quenched particles within 0.03–4 mm$^3$/particle. Furthermore, copolymer particles having an average volume greater than 4 mm$^3$/particle involve such inconvenience that their quenching will be difficult.

A dispersant may be used upon dispersing copolymer particles in a dispersing medium. As such a dispersant, there may be mentioned fine powdery (or fine particulate) aluminum oxide, basic magnesium carbonate, talc, fine powdery (or fine particulate) aluminum hydroxide or the like. It may be used in an amount of 0.1–10 parts by weight per 100 parts by weight of propylene-base random copolymer particles.

As dispersing media useful in the practice of this invention, there may, for example, be mentioned water, ethylene glycol, glycerin, methanol, ethanol and the like which may be used either singly or in combination. Of these dispersing media, water is preferred. The dispersing medium may be used in an amount of 100 parts by weight or more per 100 parts by weight of copolymer particles.

Starting copolymer particles are heated to a temperature above the crystallization temperature thereof, preferably to a temperature of (the crystallization temperature plus 35° C.) or higher, and more preferably to a temperature of their melting point or higher. If the heating temperature should be lower than their crystallization temperature, it will be difficult to obtain copolymer particles having good foamability and it will hence be impossible to achieve the objects of this invention. More preferably, the copolymer particles are, subsequent to their heating to a temperature beyond their melting point, released at a temperature of (their crystallization temperature +35° C.) or higher out of the vessel. After raising the temperature of the copolymer particles to a desired temperature, it is also preferred to hold the copolymer particles at the desired temperature for at least 15 minutes. Subsequent to the heating of the copolymer particles, the copolymer particles are released into a medium at a temperature of (their crystallization temperature −30° C.) or lower to quench them. As a quenching method, it may be possible to employ such a method as blowing a cooling medium, e.g., cooling air, cooling water or the like against the thus-heated copolymer particles. It is however effective to quench them with cooling water. As a specific method for blowing cooling water against the copolymer particles, it is possible to employ such a method that the copolymer particles and dispersing medium are both released out of the vessel into a discharge pipe and water is then introduced into the discharge pipe to quench the thus-released copolymer particles. In this case, it is preferred to effect the introduction of cooling water in such a way that the temperature of the copolymer particles is lowered to (the crystallization temperature −30° C.) or lower within 10 minutes, or preferably within 5 minutes.

The first production process is suitable primarily for obtaining spherical copolymer particles.

Turning next to the second production process, a propylene-base random copolymer is charged in an extruder, in which the copolymer is heated and melted.

The copolymer charged in the extruder may be in the form of pellets or powder or may be that ground by a grinder.

After extruding the melted copolymer through extrusion orifices of the extruder into strands, the strands are brought into a cooling medium of (the crystallization temperature −30° C.) or lower in order to quench them. Here, the average diameter of the strands of the melted copolymer extruded in the form of strands through the extrusion orifices may preferably be 1.7 mm or less. If the average diameter of the strands should exceed 1.7 mm, it will be difficult to quench the strands. The individual strands are then chopped by a cutter into particles, thereby obtaining copolymer particles. Here, it is preferred to effect the chopping of the strands in such a way that the average volume of the resulting copolymer particles falls within the range of 0.03–4 mm$^3$/particle and their average length L and average diameter D satisfy $L/D \geq 1$. If $L/D < 1$, there may be encountered a problem that the effects of the quenching treatment may not be fully brought about.

The thus-chopped copolymer particles may generally take about 1 minute or so until they are immersed in the cooling medium. It is however preferred to quench them to a temperature of (the crystallization temperature −30° C.) or below as quickly as possible.

The above-described second production process is suitable as a production process for obtaining columnar particles which have an average diameter of 1.7 mm or thinner and satisfy the relation, $L/D \geq 1$.

It is also feasible to extrude a melted copolymer through extrusion orifices of an extruder directly into a cooling medium of (the crystallization temperature of the copolymer −30° C.) or lower and after chopping the extrudates by a cutter provided in adjacent to the outlets of the extrusion orifices of the extruder, to quench the thus-chopped extrudates in the cooling medium.

As the above-described cooling medium, it is feasible to use water, ethylene glycol, methanol or the like with water being most preferred.

In each of the above-described first and second production processes, the measurements of the crystallization temperature and melting temperature of the respective copolymer particles were effected by differential scanning calorimetory (DSC). According to this measurement method, about 7 mg of each sample was heated from room temperature to 220° C. at a heating rate of 10° C./min with a differential scanning calorimeter and was then lowered at a rate of 10° C./min. from 220° C. to 50° C. A temperature corresponding to a peak which was obtained in the course of the temperature decrease was recorded as the crystallization temperature of the sample. The temperature corresponding to the peak of an endothermic curve, which was obtained when the sample was thereafter again heated at a rate of 10° C./min, was recorded as the melting point of the sample. Where two or more peaks were obtained, the temperatures corresponding respectively to such peaks were averaged.

The average volume of copolymer particles obtained by each of the above-described production processes is preferably 0.03–4 mm$^3$/particle. If the average volume should be smaller than 0.03 m³/particle, it will be difficult from such copolymer particles to obtain pre-foamed particles having a high expansion ratio and containing closed cells in a high proportion.

If the average volume should exceed 4 mm³/particle on the other hand, more and greater voids will be observed in a molded article produced from pre-foamed particles which have in turn been obtained from such copolymer particles. It is thus impossible to make molded articles having complex configurations or small wall thicknesses from such copolymer particles.

In addition, the preferable melt flow rate of resulting copolymer particles may range from 0.5 g/10 min. to 30 g/10 min. If this value should be lower than 0.5 g/10 min., it will be difficult to subject the copolymer particles to pre-foaming. On the other hand, any values greater than 30 g/10 min. will eventually result in foamed moldings having insufficient strengths.

The above-described copolymer particles can be used effectively for the production of pre-foamed particles. The production of such pre-foamed particles may be carried out, for example, by charging the copolymer particles, a volatile blowing agent and a dispersing medium in a closed vessel, heating with stirring the contents to a temperature above the softening point of the copolymer particles, releasing one end of the vessel while maintaining the internal pressure of the vessel at a pressure above or lower than the vapor pressure of the volatile blowing agent, and then releasing the copolymer particles and dispersing medium simultaneously out of the vessel into an atmosphere of a low pressure. The thus-obtained pre-foamed particles contain large-diametered cells (i.e., fewer cells) and have good moldability.

It is also possible to obtain foamed moldings by using pre-foamed particles obtained in the above-described manner. Such foamed moldings have excellent properties such as small shrinkage upon their molding work and large flexibility (nerve).

The present invention will hereinafter be described in further detail by the following Examples and Comparative Examples.

EXAMPLES 1-3 & COMPARATIVE EXAMPLES 1-3

Charged in a 400-liter autoclave were 100 kg of particles of irregular shapes (having an average volume shown in Table 1) of an ethylene-propylene random copolymer (melting point: 145° C.; crystallization temperature: 100° C.), 220 kg of water and 1.5 kg of fine particulate aluminum oxide. The contents were heated with stirring to 165° C., at which they are held for 1 hour.

In each of Examples 1-3 and Comparative Examples 1-2, the autoclave was opened at one end thereof while holding the contents at the corresponding temperature given in Table 1, thereby releasing the copolymer particles and water out of the autoclave. At the same time, water of the corresponding temperature shown in Table 1 was blown against the thus-released copolymer particles to quench them to the corresponding temperature shown in Table 1. Thereafter, the resultant mixture was subjected to centrifugation to separate spherical ethylene-propylene copolymer particles from water. In Comparative Example 3, water was caused to flow through a jacket of the autoclave so that its contents were cooled to about 30° C. in the course of 1 hour. After cooling, the copolymer particles and water were released from one end of the autoclave, followed by their centrifugation.

EXAMPLES 4-5 & COMPARATIVE EXAMPLES 4-5

Pellets of an ethylene-propylene random copolymer were charged in an extruder, where they were heated and melted at 165° C. Thereafter, the melted copolymer was extruded through extrusion orifices of the extruder into strands with the corresponding average diameter shown in Table 2. After causing the strands to pass through a water bath of the corresponding temperature given in Table 2 to lower the temperature of the strands to the corresponding temperature shown in Table 2, the strands were chopped by a cutter to achieve the corresponding average volume given in Table 2.

EXAMPLES 6-7 & COMPARATIVE EXAMPLES 6-7

Pellets of an ethylene-propylene random copolymer were charged in an extruder, where they were heated and melted at 165° C. Thereafter, the melted copolymer was extruded through extrusion orifices of the extruder into a water bath of the corresponding temperature given in Table 2 and at the same time, the resultant extrudates were chopped by a cutter, which was provided in adjacent to the outlets of the extrusion orifices, to achieve the corresponding average volume shown in Table 2.

Using the copolymer particles obtained in each of the Examples and Comparative Examples, pre-foaming was conducted in the following manner. First of all, 100 kg of the copolymer particles, 220 kg of water, 300 g of fine particulate aluminum oxide and 17 kg of dichlorodifluoromethane were charged in a 400-liter autoclave. The contents were then heated to 145° C., at which they were held for 30 minutes. The autoclave was thereafter opened at one end thereof while maintaining the internal pressure of the autoclave at 30 kg/cm²(G) with nitrogen gas, so that the copolymer particles and water were simultaneously released into the atmosphere to obtain pre-foamed particles. The expansion ratio and the number of cells per mm² cross-section of the thus-obtained pre-foamed particles are given in Table 1.

After applying an internal pressure of about 1 kg/cm²(G) to the pre-foamed particles with air, they were charged in a molding and then heated with steam of 3.2 kg/cm²(G) to cause them to expand, thereby obtaining a foamed molding of a shape conforming with the molding. The shrinkage, flexibility and voids of the thus-obtained foamed molding were measured. Results are also given in Table 1.

TABLE 1

|  | Example | | | Comparative Example | | |
|---|---|---|---|---|---|---|
|  | 1 | 2 | 3 | 1 | 2 | 3 |
| Heating temp. (°C.) | 165 | 165 | 165 | 165 | 165 | 165 |
| Temp. at release (°C.) | 165 | 145 | 110 | 165 | 165 | 30 |
| Average volume (mm³/particle) | 4 | 2 | 0.1 | 0.02 | 8 | 2 |
| Temp. of cooling medium (°C.) | 20 | 35 | 25 | 75 | 75 | * |
| Temp. of copolymer particles right after their quenching (4) (°C.) | 45 | 60 | 55 | 80 | 80 | 30 |
| Pre-foamed particles | | | | | | |
| Expansion ratio (times) | 35 | 38 | 35 | 5 | 42 | 40 |
| No. of cells | 10 | 80 | 30 | 200 | 350 | 300 |

TABLE 1-continued

|  | Example | | | Comparative Example | | |
|---|---|---|---|---|---|---|
|  | 1 | 2 | 3 | 1 | 2 | 3 |
| (cells/mm²) | | | | | | |
| Shrinkage of molded article (1) | O | O | O | O | X | X |
| Flexibility of molded article (2) | O | O | O | X | X | Δ |
| Voids in molded article (3) | O | O | O | O | X | O |

TABLE 2

|  | Example | | | | Comparative Example | | | |
|---|---|---|---|---|---|---|---|---|
|  | 4 | 5 | 6 | 7 | 4 | 5 | 6 | 7 |
| Extrusion temp. (°C.) | 165 | 165 | 165 | 165 | 165 | 165 | 165 | 165 |
| Average volume (mm³/particle) | 3.9 | 2 | 4 | 2 | 3.9 | 6 | 4 | 6 |
| Average diameter (mm/particle) | 1.7 | 1.1 | * | * | 1.7 | 1.8 | * | * |
| L/D | 1 | 1.9 | * | * | 1 | 1.3 | * | * |
| Temp. of cooling medium (°C.) | 25 | 25 | 25 | 25 | 75 | 75 | 75 | 75 |
| Temp. of copolymer particles right after their quenching (4) (°C.) | 50 | 35 | 50 | 35 | 80 | 80 | 80 | 80 |
| Pre-foamed particles | | | | | | | | |
| Expansion ratio (times) | 35 | 30 | 35 | 29 | 41 | 42 | 42 | 42 |
| No. of cells (cells/mm²) | 15 | 10 | 20 | 10 | 320 | 350 | 350 | 350 |
| Shrinkage of molded article (1) | O | O | O | O | X | X | X | X |
| Flexibility of molded article (2) | O | O | O | O | Δ | X | X | X |
| Voids in molded article (3) | O | O | O | O | O | X | O | X |

In Tables 1 and 2, the shrinkages, flexibilities, voids and temperatures of copolymer particles right after their quenching were determined respectively in the following manner.

(1) Each shrinkage is represented in accordance with the following standard, based on the shrinkage of the corresponding foamed molding along a surface thereof relative to the mold.

| Less than 2% | O |
|---|---|
| Above 2% but less than 3% | Δ |
| Greater than 3% | X |

(2) Each flexibility was determined by NDS Z 0503 and is represented in accordance with the following standard:

| No crack | O |
|---|---|
| Slightly cracked | Δ |
| Cracked | X |

(3) The number of voids in each molded article was determined by counting the number of voids having diameters of an average diameter of 2 mm and greater and contained in an area of 100×100 mm on a cross-section formed by slicing the molded article at a depth of 10 mm along a surface thereof, and is represented in accordance with the following standard:

| Less than 25 voids | O |
|---|---|
| 25 voids or more | X |

(4) The temperature of each sample of copolymer particles right after its cooling was measured by filling the copolymer particles in a container of about 1 liter and then inserting a thermometer in the container.

As has been described above, pre-foamed particles produced using copolymer particles of this invention have large cells. They can thus provide foamed moldings which are substantially free of shrinkage and have good flexibility.

Having now fully described the invention, it will be apparent to one of ordinary skill in the art that many changes and modifications can be made thereto without departing from the spirit or scope of the invention set forth herein.

We claim:

1. A process for producing propylene-base random copolymer particles suitable for use in the production of pre-foamed particles, which comprises:
   charging starting propylene-base random copolymer particles together with a dispersing medium in a vessel;
   heating with stirring the contents to a temperature of the crystallization temperature of the starting copolymer particles or higher; and
   releasing the thus-heated starting copolymer particles and dispersing medium out of the vessel into a medium at a temperature of (the crystallization temperature −30° C.) or lower so as to quench the thus-heated starting copolymer particles.

2. A process according to claim 1, wherein the average volume of the starting propylene-base random copolymer particles, which are charged together with the dispersing medium in the vessel, is 0.03–4 mm³/particle.

3. A process according to claim 1 or 2, wherein the starting propylene-base random copolymer particles are ethylene-propylene random copolymer particles.

4. A process according to claim 3, wherein the starting propylene-base random copolymer particles are ethylene-propylene random copolymer particles in which the ethylene component amounts to 0.5-10 wt. %.

5. A process for producing propylene-base random copolymer particles suitable for use in the production of pre-foamed particles, which comprises the following steps:
   heating and melting a propylene-base random copolymer resin in an extruder;
   extruding the resultant melt through orifices of said extruder;
   quenching the resultant extrudates with a cooling medium at a temperature of (the crystallization temperature of propylene-base random copolymer resin $-30°$ C.) or lower; and
   chopping the thus-quenched extrudates into particles.

6. A process according to claim 5, wherein the quenched extrudates are chopped into particles having an average volume of 0.03-4 mm$^3$/particle.

7. A process according to claim 5, wherein after extrusion of the heated and melted resin into strands through the orifices of the extruder, the strands are quenched with a cooling medium at a temperature of (the crystallization temperature $-30°$ C.) or lower and then chopped into particles of 0.03-4 mm$^3$/particle.

8. A process according to claim 7, wherein through the orifices of the extruder, the resin is extruded into strands having an average diameter of 1.7 mm or thinner.

9. A process according to claim 5, wherein the heated and melted resin is extruded through the orifices of the extruder into the cooling medium of (the crystallization temperature $-30°$ C.) or lower while simultaneously chopping the resultant extrudates into particles of 0.03-4 mm$^3$/particle, and the resultant particles are then quenched with the cooling medium.

10. A process according to claim 5, wherein the cooling medium is water.

11. A process according to claim 5, wherein the propylene-base random copolymer resin is an ethylene-propylene random copolymer.

12. A process according to claim 11, wherein the ethylene-propylene random copolymer is an ethylene-propylene random copolymer in which the ethylene component amounts to 0.5-10 wt. %.

* * * * *